United States Patent [19]
Waldo et al.

[11] Patent Number: 5,475,817
[45] Date of Patent: Dec. 12, 1995

[54] OBJECT ORIENTED DISTRIBUTED COMPUTING SYSTEM PROCESSING REQUEST TO OTHER OBJECT MODEL WITH CODE MAPPING BY OBJECT MANAGERS LOCATED BY MANAGER OF OBJECT MANAGERS

[75] Inventors: James H. Waldo, Dracut; Kenneth C. Arnold, Newton Centre; Marlena E. Erdos, Somerville, all of Mass.; Douglas B. Robinson, Hollis; D. Jeffrey Hoffman, Nashua, both of N.H.; Lamar D. Smith, San Jose, Calif.; Peter S. Showman, Cupertino, Calif.; Michael J. Cannon, Palo Alto, Calif.; Andrew F. Seaborne, Bristol, England; Brian W. McBride, Los Altos; Brian D. Harrison, Saratoga, both of Calif.

[73] Assignee: Hewlett-Packard Company, Palo Alto, Calif.

[21] Appl. No.: 159,764

[22] Filed: Nov. 30, 1993

Related U.S. Application Data

[63] Continuation of Ser. No. 660,478, Feb. 25, 1991, abandoned.

[51] Int. Cl.$^6$ ................................ G06F 15/16
[52] U.S. Cl. ................................ 395/650; 364/DIG. 1; 395/600; 395/200.02; 395/700; 395/200.12; 395/200.11
[58] Field of Search ................................ 395/200, 500, 395/600, 650

[56] References Cited

U.S. PATENT DOCUMENTS

| | | | |
|---|---|---|---|
| 4,814,970 | 3/1989 | Barbagelata et al. | 364/200 |
| 5,008,853 | 4/1991 | Bly et al. | 364/900 |
| 5,079,695 | 1/1992 | Dysart et al. | 395/700 |
| 5,088,032 | 2/1992 | Bosack | 395/200 |
| 5,095,522 | 3/1992 | Fujita et al. | 395/200 |
| 5,126,932 | 6/1992 | Wolfson et al. | 364/131 |
| 5,136,712 | 8/1992 | Perazzoli, Jr. et al. | 395/700 |
| 5,146,559 | 9/1992 | Orimo et al. | 395/200 |
| 5,179,715 | 3/1993 | Andoh et al. | 395/800 |
| 5,261,080 | 11/1993 | Khoyi et al. | 395/500 |

FOREIGN PATENT DOCUMENTS 0304071  2/1989  European Pat. Off. .

OTHER PUBLICATIONS

Decouchant et al, "Remote Execution and Communication in Guide-Object oriented distributed System", IEEE 1990.
Balter et al, "Experience with object based distributed computation in the Guide Operating System" IEEE 1989.
Black et al, "Implementing Location Independent Invocation," IEEE 1990, Jan.
R. J. Fowler, "Decentralized object finding using forwarding addresses" U. Washington Ph.D dissertation Dec. 1985.
"Distributed Object–Based Programming Systems", =R. S. Chin/S. T. Chanson, ACM Computing Surveys, vol. 23, No. 1, Mar. 1991, pp. 91–124.

(List continued on next page.)

*Primary Examiner*—Ken S. Kim

[57] ABSTRACT

An object oriented distributed computing system is provided. Processing means call a location service within automatically generated stubs in response to a request for a service provided by a particular object. The location service is automatically called on behalf of the requester to locate the target object when the request is issued. Multiple Object Managers reflecting multiple Object Models are permitted in the system. Programmers and users do not need to know the Object Model adhered to by an Object Manager. A request to any object in the system is independent of the Object Model of the sought object's Object Manager. A generic interface enables new Object Managers reflecting new Object Models to be easily added to the system. Availability of the target object is independent of association of the target object with a process at the time the request was issued. Deactivation of processes is automatically accomplished in response to the system needing resources.

2 Claims, 4 Drawing Sheets

OTHER PUBLICATIONS

"The Eden System: A Technical Review", G. T. Almes, et al., IEEE Trans. on Software Engineering, vol. SE–11, Jan. 1985, pp.

"Distribution and Abstract Types in Emerald", A. Black, et al., IEEE Trans. on Software Engineering, vol. SE–13, Jan. 1987, pp. 65–76.

"The Eden Programming Language", A. P. Black, Tech. Rep. 85–09–01, Dept. of Computer Science, University of Washington, Seattle, Wash., Sep. 1985(rev. Dec. 1985).

"Supporting Distributed Applications: Experience with Eden", A. P. Black, Tech. Rep. 85–03–02, Dept. of Computer Science, University of Wash., Seattle, Wash., Sep. 1985.

"UIDs as Internal Names in a Distributed File System," P. J. Leach, et al, Proc. of the Symposium on Principles of Distributed Computing, Ottawa, Canada, Aug. 1982, pp. 34–41.

UNIX Programmer's Ref. Manual, 4.3 BSD Virtual VAX–11 Version, Univ. of Calif., Berkeley, Apr. 1986, Sel. pp.(MAN pp on INETD,GETPROTOENT, GETSERVENT, SERV./p. PS1:8–14) Apr. 1986.

"Request for Comments 1034: Domain Names—Concepts and Facilities", P. V. Mockapetris, ISI Network Working Group, Nov. 1987.

E. Jul et al., "Fine–Grained Mobility in the Emerald System," *ACM Transactions on Computer Systems*, vol. 6, No. 1, (Feb. 1988): 109–133.

"Object Data Manager," *IBM Technical Disclosure Bulletin*, vol. 32, No. 10A (Mar. 1990): 55–57.

A. Benkiran et al., "A Communication System Architecture for the Office," Proceedings Eighth Annual Joint Conference of the IEEE Computer and Communications Societies, vol. II, Apr. 23–27, 1989, 382–392.

S. Blount, "Distributed Computing Is Demanding New Technologies," *Technology Review*, vol. 10, No. 5, (Apr. 1990): 21–25.

OBJECT ORIENTED DISTRIBUTED COMPUTING SYSTEM PROCESSING REQUEST TO OTHER OBJECT MODEL WITH CODE MAPPING BY OBJECT MANAGERS LOCATED BY MANAGER OF OBJECT MANAGERS

This is a continuation of application Ser. No. 07/660,478 filed on, Feb. 25, 1991, now abandoned.

BACKGROUND OF THE INVENTION

"Distributed computing" is a well known concept in the field of computer processing. Basically, distributed computing allows processes on different computers in a network of computers to communicate with each other and provide services for each other. The computers in the network may have distinct machine architectures and operating systems.

The most common paradigm of distributed computing is known as the "client-server model". Consumers of services i.e. clients, make requests of service providers i.e. servers.

Various disadvantages in client server distributed computing exists. For example, current systems require clients processes to be coded so as to explicitly acquire (or "know") the locations of servers they wish to use. Further, if a server changes location while a client is using it, the client must be coded so as to perform a relocation of the server. Without such relocation the client will fail in its attempt to communicate with the server.

Most systems also require a server to be active prior to any attempted use by a client. A client trying to use an inactive server will fail in its attempt to obtain the service it needs.

Other distributed computing systems either have no notion of computer programming entities called "objects", or require objects to conform to a particular object model dictated by the system. Because there is at most one object model in a given system and no common models across systems, such distributed computing systems are unduly limiting. That is, such systems are limited in their ability to incorporate new technology and to extend to problem domains for which the system was not originally designed.

As used herein an "object" is a programming entity comprising some state and a set of defined behaviors. The state is represented by data maintained by the object. The behavior is specified in terms of operations the object can perform. Operations are realized by executable code. Conceptually the data and the code are inextricably bound together in the object. Objects may be "persistent", that is they may continue to exist even though they are inactive or the computer on which they exist has failed or been turned off. Further, objects may issue requests for services to other objects as well as supply services.

As used herein "class" refers to an object's type and specifies what kind of object it is. For example, Garfield and Snoopy while distinct "objects" are both "cartoon characters". "Cartoon character" is the class of each. A different kind of entity say, the World Trade Center, would have a different class (in this case perhaps "building") .

As used herein an "object manager" is an entity which manages groupings of objects supporting each object's existence and operation.

Also, as used herein, "object model" is an abstraction of the activities a particular class of object manager performs and the way it performs them. These activities include (i) managing the persistent state of objects, (ii) mapping operations on objects into code.

According to the foregoing, improvements in distributed computing are needed.

SUMMARY OF THE INVENTION

The present invention provides a distributed computing system that solves the problems of prior art. In particular, the present invention provides an object oriented distributed computing system which, unlike other distributed computing systems, does not require clients of services to be coded so as to know or acquire the locations of service providers. Futher, this system, unlike other object-oriented computing systems, recognizes objects that conform to various object models.

In particular, the present invention provides management apparatus for an object oriented distributed computing system. The management apparatus employs a location service for locating desired objects in system on behalf of requesting objects or processes (i.e. requesters). A requester need not be coded to have any awareness of the location service (much less the details of the location service).

Specifically, the location service is automatically contacted when a requester makes a request to a service-providing object i.e "target object". The preferred embodiment employs processing means for calling the location service within automatically generated stubs. Further, the location service locates objects based on the identity of the object where each object has a unique identity in the system. This unique identity encodes an indication of the computer on which the object was created.

The location service comprises various kinds of entities in the system. There are Object Managers each of which supports the existence and operation of the objects that are associated with it; Managers of Object Managers, each of which manages a grouping of Object Managers; Object Region Managers each of which tracks the location of objects with respect to computers in the system. A distinct object region is defined for each different grouping of computers, where each region has its own Object Region Manager. To provide a mapping between computers and Object Region Managers the location service employs mapping means.

In accordance with one aspect of the present invention a common generic interface allowing a common means of communication with and among the object managers, managers of object managers, object region managers and mapping means is employed.

In addition, object managers are based on respective object models. Objects associated with an object manager based on one object model are able to transmit requests to objects associated with a respective object manager based on a different object model.

Further, in one embodiment there exists a generic interface supported by object managers managed by a common Manager of object managers such that the Manager of object managers is able to communicate with each of its object managers in a manner free of explicit knowledge of the respective object model of the object manager.

Preferably each object manager treats groupings of objects associated with it as respective equivalence classes. To that end, the object manager tracks object process association as a group instead of individually. Further, preferably the object managers provide deactivation of processes in automatic response to the system needing resources.

In accordance with another aspect of the present invention the management apparatus further employs means for servicing a request for a target object independent of association of the target object with a process at the time of the request. To that end, all objects in the system appear to be available for processing requests even though a given target object may not be associated with a process at the time of the request.

Said another way, an object oriented distributed computing system of the present invention provides computer means for implementing operations and data of a target object, in one process of the plural processes of the system, in response to a request to the target object. As a consequence, availability of each object is defined independent of the association of the object with a process at the time of the request.

BRIEF DESCRIPTIONS OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

Figure 3A:
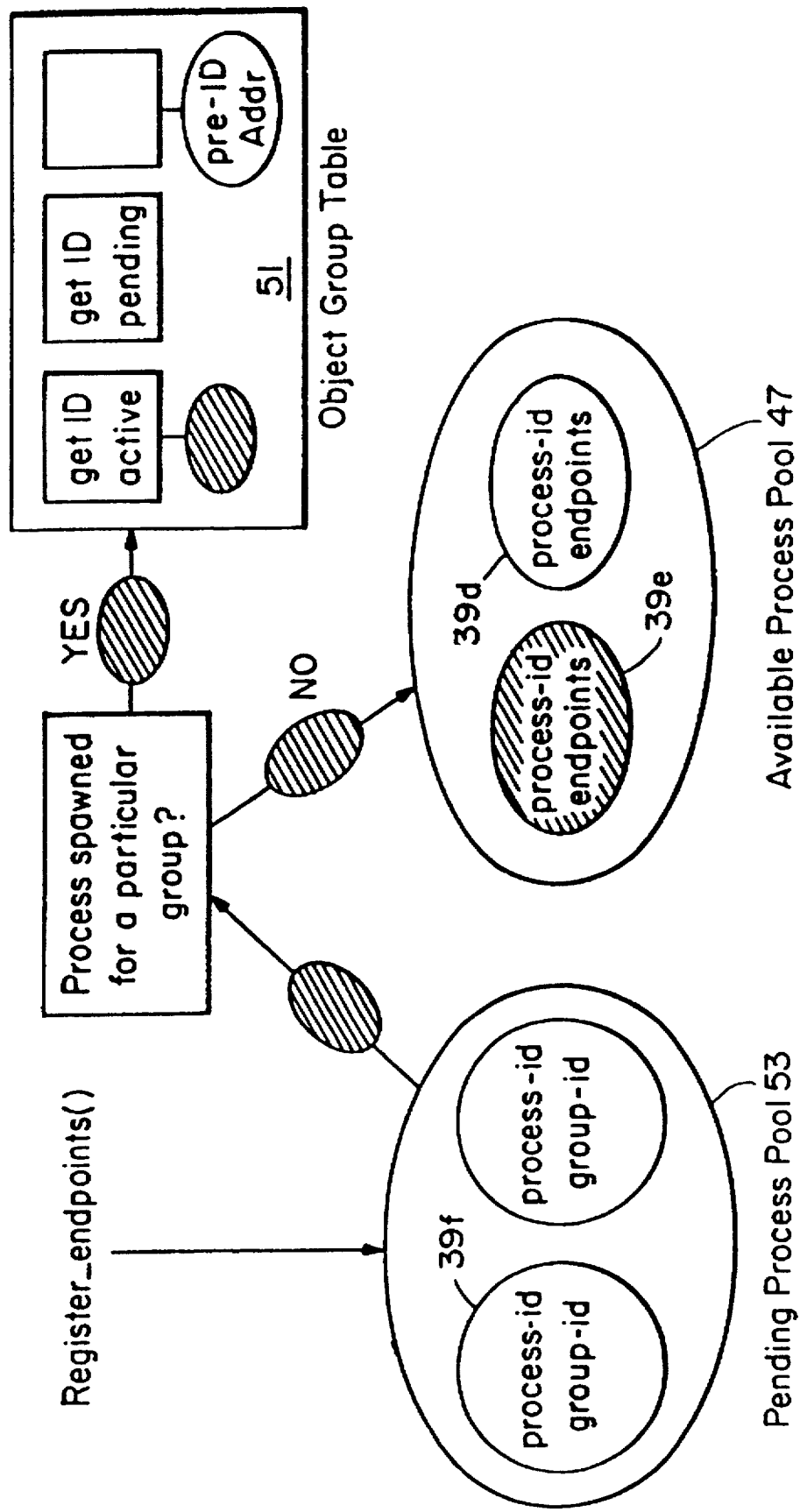
Figure 3B:
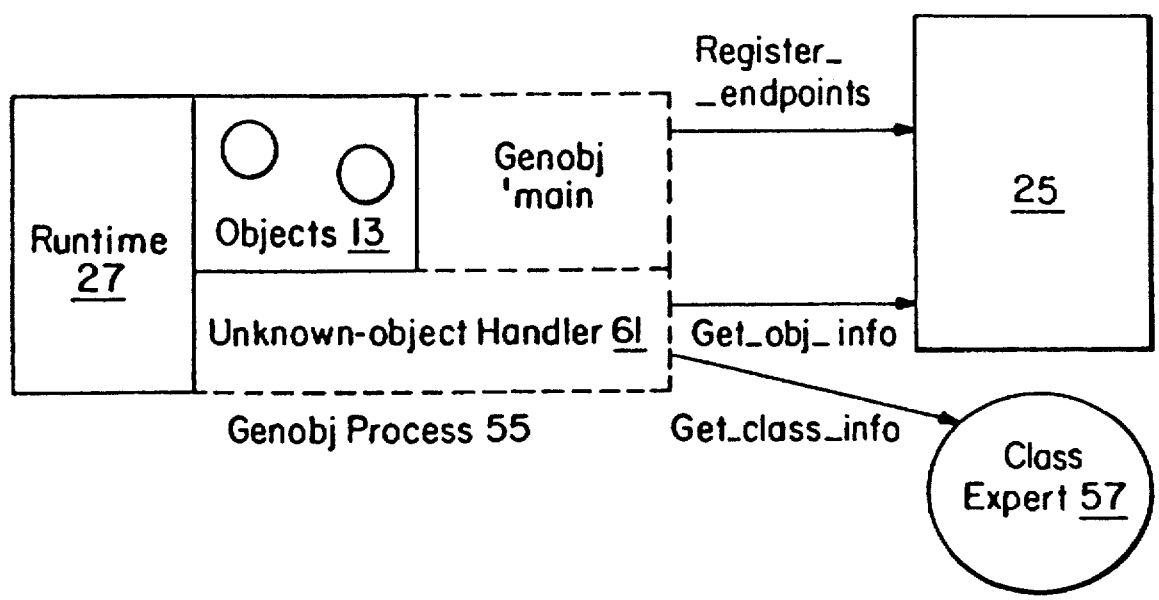

FIGS. 3a and 3b each illustrate object activation in the present invention.

DETAILED DESCRIPTION OF THE PREFERRED EMBODIMENTS

Figure 1:
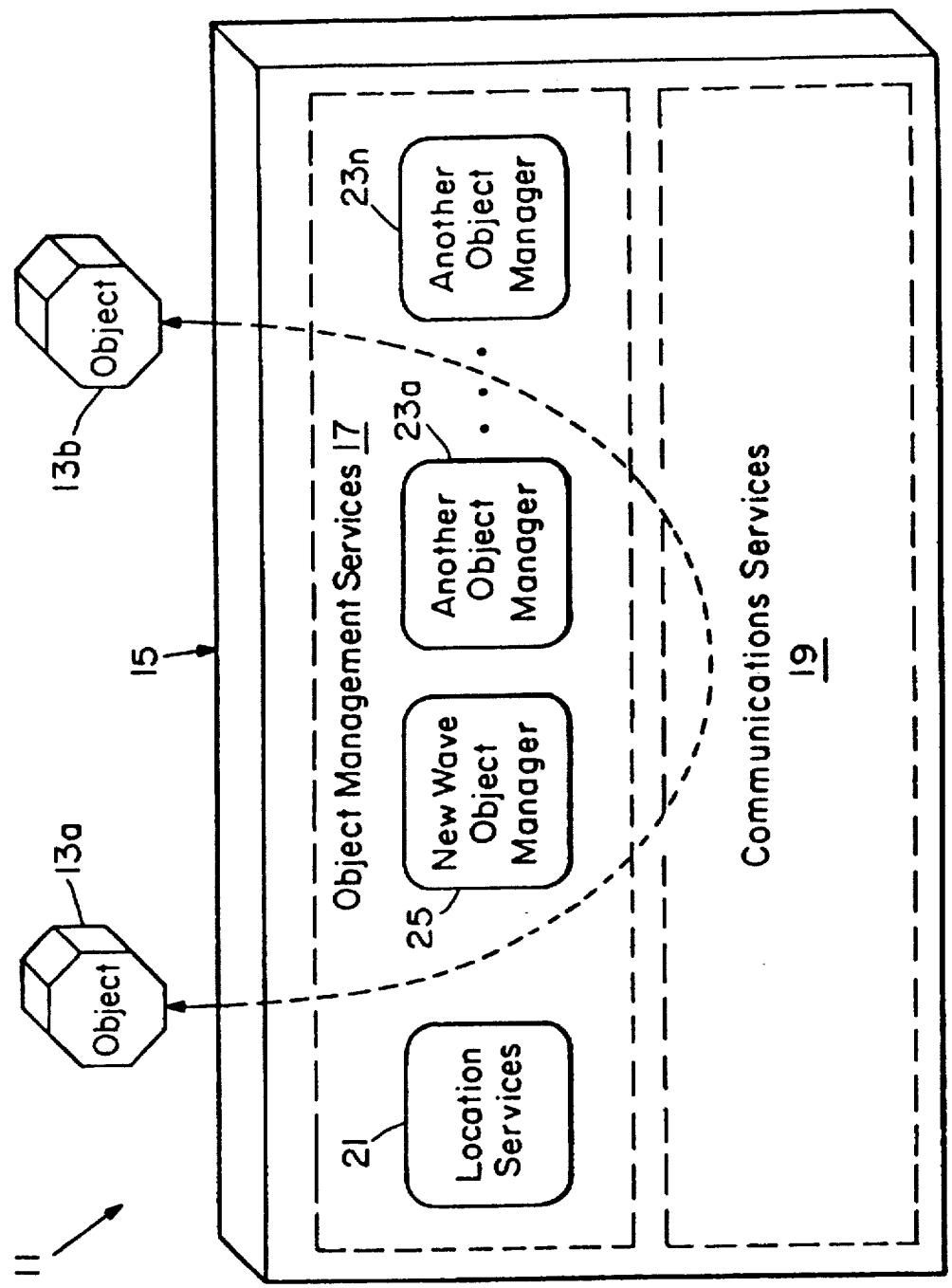
FIG. 1 is a schematic diagram of an object oriented distributed computing system embodying the present invention.
Figure 2:
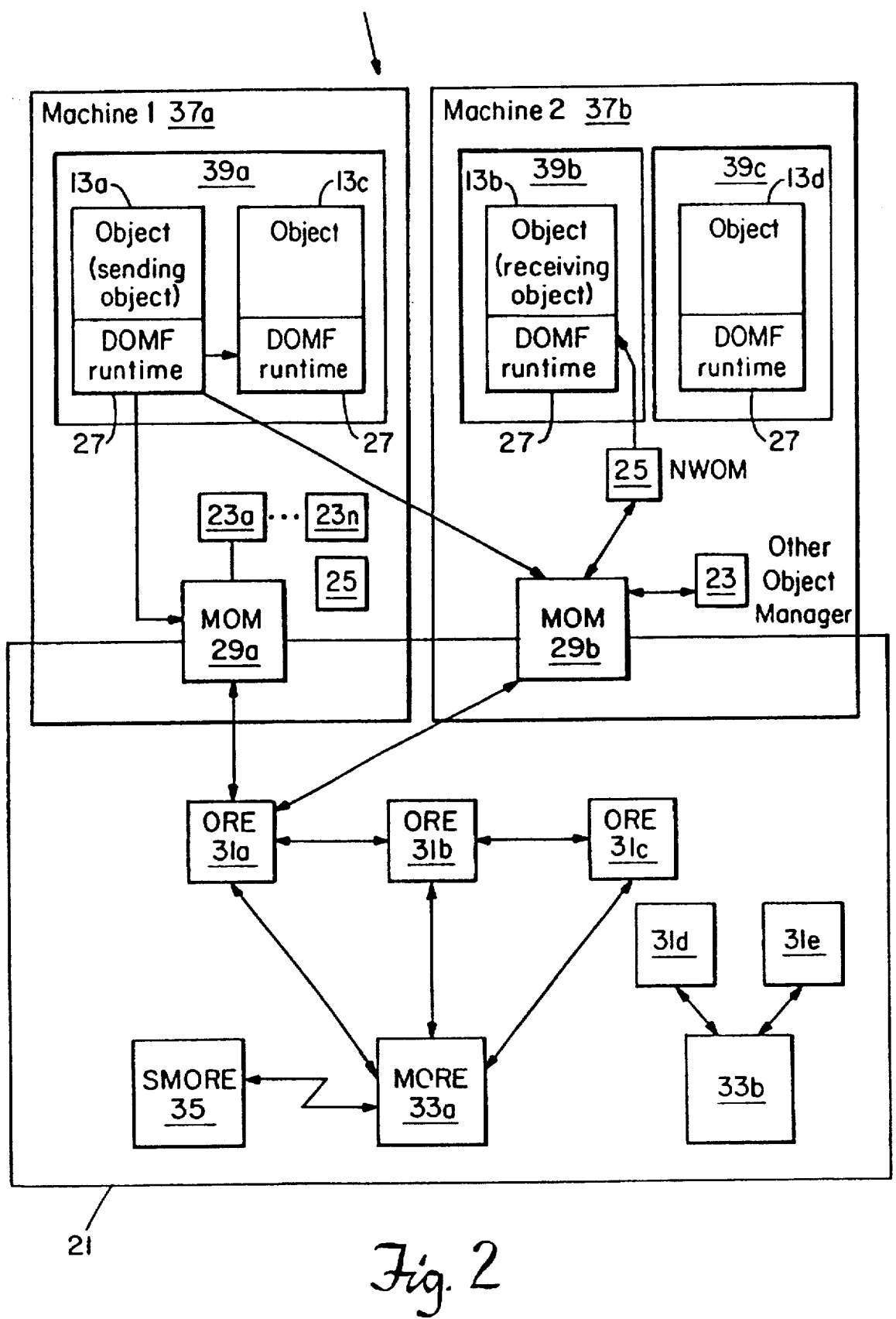
FIG. 2 is a block diagram of object/process management apparatus of the present invention employed in the system of FIG. 1.

Illustrated in FIGS. 1 and 2 is an object oriented distributed computing system 11 embodying the present invention. The system 11 comprises a plurality of loosely coupled computers 37 which form a network. On each computer 37 their may be one or more processes 39 in which various objects 13 perform respective operations. The objects 13 in FIG. 1 reside in the same or different process 39 on the same or different computers 37 of the network defining the object oriented distributed computing system 11.

At the heart of the system 11 is an object/process management apparatus 15 of the present invention. By way of overview, apparatus 15 handles the following object behavior:

(1) registers all existing objects 13 in system 11;

(2) enables objects 13a to issue requests to other objects 13b (that are potentially in different address spaces and/or computers); and (3) delivers the requests and manages their execution.

The apparatus 15 does not require that objects 13 be compiled or linked together before one may issue a request of the other. An object 13 may issue a request to any other object 13 in the system provided it has a reference to that object.

Further, the invention apparatus 15 supports distribution of objects 13 among processes in the system 11. An object or a process can issue requests to objects on other computers in the network. The object or process (i.e., requestor or client) issuing the request does not need to be aware on which computer the target object is to be found, or even whether the target object is on a different computer. The invention apparatus 15 determines location of the target object in an automatic manner on behalf of a client without explicit human coding of client calls to a location service (discussed later). Different kinds of networks can be supported, including broadcast networks such as many local area networks (LANs) and connection-oriented networks, such as many wide area networks (WANs).

In addition, the apparatus 15 supports heterogeneity. Different types of computers may be mixed in the network. The invention apparatus 15 manages any differences between the computers containing the object issuing the request (the sender) and the object executing the request (the receiver). A common problem occurs when two computers have different processors that represent data differently. Motorola 68xxx series processors and Intel 80xxx series processors, for example, store integers differently in memory. The invention apparatus 15 manages the translation of the parameters of the requests between the formats of the two computers when necessary.

The invention apparatus 15 also supports multiple user sessions simultaneously. The apparatus 11 can manage objects on a single user computer such as a personnel computer or single-user workstation. Equally, the apparatus 15 can manage objects on a multi-user computer. Objects managed by the apparatus 15 may simultaneously be performing services on behalf of several different users. The apparatus 15 contains a security mechanism to protect against unauthorized use of services.

Further, the apparatus 15 is scaleable. In the network of computers, each computer runs an implementation of the invention apparatus 15. At the low end, the apparatus 15 can function efficiently on a stand-alone single-user computer. At the high end, the apparatus 15 can operate efficiently on each machine in an entire network that includes all the computers of a large multinational corporation.

To accomplish the foregoing the invention apparatus 15 has a two layer structure. The lower layer is formed of communication services 19 which provide a uniform mechanism for issuing and delivering requests among objects 13. The communication services layer 19 enables requests to be delivered among objects by, among other operations, converting data representations when the requester object and the target object are on different kinds of computers. Security mechanisms are also provided to prevent unauthorized access to objects. The communications services 19 also isolates the rest of the management apparatus 15 and objects 13 from the effects of different network topologies, protocols and software.

An upper layer of the management apparatus 15 is formed of the object management services 17 which include object managers 23, 25 and a location service 21. Object managers 23, 25 provide services such as object activation and deactivation, and object class installation. The location service 21 enables the apparatus to determine a communication path to a particular object 13. Thus, the object management services layer 17 manages an object's life cycle (creation, instantiation, and deletion) and location.

In the preferred embodiment the communications services 19 and object management services 17 are implemented by a runtime library 27, object managers 23, manager of object managers 29 and location service 21 shown in FIG. 2. The runtime library 27 resides in the address spaces of the objects 13 being managed by the computing system 11 and can be thought of as part of all of those objects. The runtime library 27 provides a basic interface used by all objects 13 in communicating within the system 11. Preferably the runtime library 27 contains code that allows communication with the persistent storage manager (described later) and code that allows the creation of object references used by the location services 21.

The object managers 23 are responsible for directly managing objects 13, activating and deactivating objects, delivering messages to objects, and keeping track of whatever state is needed for those activities. To that end, each object 13 is associated with an object manager 23 such that different pluralities of objects are managed by different object managers. The present invention provides as least one default object manager 25 in the management apparatus 15. A minimal subset of the operation interfaces of the default object manager 25 define the services that must be provided by all other object managers 23. Following these interfaces and a common generic interface used by a manager of object managers 29 (discussed below), new object managers are allowed to be subsequently added.

Each object manager 23 is associated with a manager of object managers (MOM) 29. Also, associated with such MOM 29 is a default object manager 25. Each manager of object managers (MOM) 29 is responsible for receiving messages that are directed to objects 13 associated with the object managers 23 that it (the MOM) manages. Each MOM 29 is also responsible for finding the object manager 23 with which a given object is associated, thus the MOM 29 serves as the local clearing house for requests. Said another way, the MOM 29 is designed as a well known receiving point for requests coming in for any of the objects that are managed by any of the object managers 23 which are in turn managed by (associated with) the manager of object managers (MOM) 29.

The location services 21 are responsible for finding the current location of any object 13 within the system 11. These services 21 are used by the system 11 in an automatic manner and are completely hidden to programmers who are writing applications within the system 11 or users who are using objects 13 within the system 11. In particular, the present invention provides processing means for automatically calling location services 21 on behalf of the requesting object (or process), in response to a request on a target object. As a result, requesting objects (or processes) do not have to be explicitly coded to call the location services 21 as required in the prior art.

The runtime library and the manager of object managers (MOM) 29 operate in both the communication services layer 19 of management apparatus 15 and object management layer 17. In the communication services layer 19, the runtime library 27 handles the passing of messages from one object 13 to another, and the manager of object managers (MOM) 29 acts as the lowest level object location service. In the object management services layer 17 the runtime library 27 along with the set of object managers 23 deals primarily with the object lifecycle.

Communication from the objects 13 point of view occurs through the runtime component of layers 17, 19. The runtime 27 contacts location services 21 to find a target object 13b and sends messages from object 13 to object 13b as discussed next. It is noted that the location services 21 run on some computer or computers in the overall system 11. From the point of view of the object 13, however, those services 21 are not located on any particular computer 37. Hence, FIGS. 1 and 2 show these services 21 as existing but not located on a particular machine 37.

Referring to FIG. 2, the location services 21 employ a hierarchy of elements. As previously mentioned objects 13 operate in a process or processes 39 of a computer or different computers 37. A plurality or group of objects 13 are associated with an object manager 23 which is responsible for managing those objects 13. In turn, the object managers 23 are grouped and associated with a manager of object managers (MOM) 29. Each object manager 23 is based on a respective object model 24, there being any number of object models 24 in the system 11. Object managers 23 of different object models 24 are able to be managed by a common MOM 29 through a generic interface discussed later. In addition, objects associated with an object manager 23 based on one object model 24 are able to transmit requests to objects associated with a respective object manager based on a different object model 24 as discussed in detail below.

Further each MOM 29 is associated with an object region manager 31 as follows. Different object regions are defined by sets of computers 37 which are grouped together for administrative purposes. For each object region there is an object region manager 31. The role of the object region manager 31 is to map object references to a (possibly empty) set of manager of object managers (MOM) 29 that might know about target objects 13b. An object region manager 31 comprises a single database and a set of processes that allow inquiry into and manipulation of that database. Preferably, a logically single object region manager 31 is replicated within the region for purposes of high availability. Each region has its own distinct object region manager 31.

In the next level of the hierarchy of elements in location services 21 are meta object region managers 33. These managers map object references to the identifier of the appropriate object region manager 31 that knows about that object. Distinct meta object region managers 33 communicate with each other to allow location of objects 13 between object regions. Like the object region managers 31, each meta object region manager 33 comprises a single database and a set of processes which inquire into and manipulate that database. Each logically single meta object region manager 33 may be replicated. Each system has its own distinct meta object region manager 31.

on the terminal level of the hierarchy are sibling meta object region managers 35 which maintain a list of two or more distinct meta object region managers 33.

In the preferred embodiment, there is a common generic interface between the different entities of the foregoing hierarchy. The common generic interface allows a common means of communication with and among object managers 23, MOM's 29, object region managers 31 and mapping managers 33.

Interaction among objects 13 is by means of requests sent from one requestor (i.e., object or process) to a target object asking for some operation on the target object. Operation calls are the basic form of communication between objects 13 that reside in the framework defined by the management apparatus 15 of the present invention. Basically, an operation is a way to request that a target object supply some information, undertake some manipulation of its own state and/or make operations on other objects. An operation is defined by its call signature. The signature consists of a return type (possibly null), a list of parameter specifications and whether the operation is synchronous (the default) or asynchronous.

The management apparatus 15 of the present invention defines its operation calls to objects as all having the following syntactic form:

```
return_type
    Operation_Name(
        objref_t          target_object,
        type              Param1,
        ...,
        type              ParamN
    );
```

An opaque handle referred to as an objref_t is used to identify the object to which the request is to be sent (i.e., target object). In the preferred embodiment, oberf_t is a pointer to a system defined structure which is implementation dependent. The internal structure of such handles are not visible or available to users of the system 11. Users of the system 11 create and delete objref_t handles through calls to the runtime library 27.

Some parameters are conceptually passed by reference; that is, they have the status of output or input-output parameters. The first parameter to all operations is a system defined object references to the target object that is to receive the request. If the method invoked by the call returns a simple value, that value is returned as the return value for the operation. If the method returns multiple values, those values are returned in the parameters to the operation which are capable of returning values. Also, all management apparatus 15 operations are defined to return a status value, which can be used to determine whether the operation succeeded. If the operation fails, the status value indicates the nature of the failure.

An interface is a non-empty set of operations that are logically related and form a semantic unit. The management apparatus 15 makes the following requirement regarding interfaces: if an object class supports any operation in an interface, it must support all of the members of the set of operations that constitute that interface. Further, each interface is identified by an interface identifier that is assigned by the implementor who originally designed the interface.

A method is the code that implements an operation. For a given operation that code may vary from one object 13 to another because of differences in computer architecture or for other reasons. An operation is used to specify the action that is to be performed on an object 13. A request made of an object 13 is mapped to a method on that object 13. This mapping associates a particular implementation with the operation defined in an interface supported by the object 13. It is the responsibility of the class implementor to ensure that the method associated with the operation request performs the appropriate actions to give the intended semantics to the request.

According to the foregoing, in response to an object operation call from a requester, the MOM of the target object's object manager interacts with the object manager to forward the request to the target object 13b. The object manager 23 associated with the target object 13b receiving the operation call also ensures that the target object 13b is capable of receiving the request.

The managers of object managers (MOMs) 29 are designed to allow the addition of multiple object managers 23 over the life of the computing system 11. This is accomplished by a common generic interface supported by object managers 23 managed by a common MOM 29, such that the MOM 29 is able to communicate with each object managers 23 without explicit knowledge of the object model on which the object manager is based. The exact way in which the MOM 29 and a particular object manager 23 communicate is the same for any particular implementation of the manager of object managers 29, but may vary from implementation to implementation.

The separation of the managers of object managers (MOMs) 29 and the individual object managers 23 allows objects 13 with very different attributes to coexist within the computing system 11 without limiting the ability of those objects 13 to interoperate. The separation also allows the MOMs 29 to know about the communications services used throughout the system 11, while the individual object managers 23 know the particulars of the objects 13 that are associated with them.

Moreover, this splitting of knowledge allows the MOMs 29 to receive requests for any type of object 13. In response to receipt of a request, the MOM 29 determines if the target object 13b of the request is one which is managed by one of the object managers 23 associated with that MOM 29. In turn, the individual object manager 23 of the target object 13b ensures that the target object 13b is ready to receive the request. The object manager is able to accomplish this by having or aquiring specific knowledge of the target object 13b being managed. In one case, ensuring that a target object 13b is ready to receive a request requires that the associated object manager 23 activate the target object 13b. This, in turn, requires that the associated object manager 23 know the execution model and persistent storage scheme used by the target object.

The net effect of the foregoing separation of responsibility between the managers of object managers (MOMs) 29 and the individual object managers 23 can be restated as follows. The MOM 29 acts as a well known receiving point and a forwarding agent for requests, while the object managers associated with the MOM 29 act as the object model-specific activators and manipulators of objects 13b.

To function in the distributed computing system defined by the management apparatus 15, objects 13 support certain operations. In the preferred embodiment, all objects 13 support the following functions.

```
acl_t
    get_acl(
        objref_t          object,
        status_t          *status
    );
```

The function get_acl returns an access control list associated with the object referred to by the parameter "object".

```
boolean
    set_acl(
        objref_t          object,
        acl_t             to_acl,
        status_t          *status
    );
```

The function set_acl associates the access control list referred to by to_acl with the object referred to by the parameter "object". The function returns the value "true" if the setting is successful, and "false" otherwise. Note that the access control list currently associated with the parameter "object" must allow the sender of the request the rights to set the access control list for the operation to be successful.

```
boolean
```

-continued

```
set_class_id(
    objref_t         object,
    classid_t        to_class,
    status_t         *status
);
```

The function set_class_id changes the class identifier associated with the object referred to by the parameter "object" to the value specified in to_class. The function returns the value "true" if the setting was successful; otherwise the function returns a value of "false".

```
boolean
inq_colocation(
    objref_t         of_object,
    objref_t         with_object,
    status_t         *status
);
```

The function ing_colocation asks of the object referred to by of_object if it is colocated with the object referred to by with_object. The function returns "true" if the objects are colocated; otherwise the function returns "false". Note that the sematics of colocation are dependent on the persistent storage mechanism and/or object manager associated with the objects.

During runtime, calls or operation requests are processed as follows. The runtime library 27 is bound to all objects 13. It serves both as the departure point for sending requests and the final destination for receiving requests. As part of this function, runtime library 27 provides an interface to construct object references, which are basic entities in the Location Services 21. The runtime 27 also provides an interface to the Persistent Storage Manager, which allows objects to manage their persistent state with the aid of the default object manager 25 as discussed later.

The sending and receiving of requests is transparent to the user of the system 11 and the writer of objects 13, or more accurately, classes of objects. Request transmission is defined by the internal runtime functionality and by the stubs (i.e., interface code fragments) generated by an interface compiler when it processes the class's operation interfaces. However, three functions are exported from the runtime 27. The first function allows the comparison of two object reference handles to determine if they refer to the same object. The second function allows the creation of an object reference to a class object. The third function allows the destruction of an object reference handle.

The first exported runtime function in the preferred embodiment is as follows:

```
boolean
omf_objref_equal(
    objref_t         ref1,
    objref_t         ref2,
    status_t         *status
);
```

The function omf_objref_equal returns the value "true" if the object reference handles of ref1 and ref2 each refer to the same object; otherwise the function returns the value "false".

The second exported runtime function in the preferred embodiment is as follows:

```
objref_t
omf_dup_objref(
    objref_t         to_dup,
    status_t         *status
);
```

The omf_ref_objref call creates a duplicate of the object reference supplied by the parameter to_dup. The resulting object reference can be given to other objects.

The third exported runtime function in the preferred embodiment is:

```
void
omf_free_objref(
    objref_t         to_free,
    status_t         *status
);
```

The function omf_free_objref deletes from storage an object reference handle.

Other functions employed in the runtime interface are as follows:

```
objref_t
omf_create(
    classid_t        obj_class,
    objref_t         group_with,
    tid_t            in_trans,
    status_t         *status
);
```

The function omf_create informs the object manager that an object exists. In response, the object manager returns an object reference to the new object, which can then be used by this object to identify itself to other objects. The call specifies the class of the new object in obj_class. Further, the parameter group_with allows the object created to be registered as being in the same group as the object referred to by that parameter. If two objects are in the same group, the object manager can assume that the objects trust each other and can make certain assumptions allowing for optimization. For example, in an implementation which assigns active objects to processes, objects which are in the same group might be placed in the same process. To that end, the object manager 23 treats groups of the objects associated with it as respective equivalence classes. In turn, the object manager 23 effectively only keeps track of the state of the groups of objects associated with it, and not the state of individual objects 13 within a group.

```
boolean
omf_delete(
    objref_t         to_delete,
    tid_t            trans_id,
    status_t         *status
);
```

The function omf_delete informs the object manager associated with an object that the object referred to by to_delete is being deleted. The effective result of the call is removal of all record of the object with the object manager. Note that this call does not free any of the persistent store associated with the object. The function returns a value of "true" if successful; otherwise it returns a value of "false".

```
boolean
    omf_change_identity(
        objref_t        object,
        tid_t           trans_id,
        objref_t        new_id,
        status_t        *status
    );
```

The function omf_change_identity changes the underlying identity of the object referred to by the parameter object to that supplied by new_id. This call is basically used only when the object formerly referred to by new_id, if any, has been or is about to be deleted. The function returns a value of "true" if successful; otherwise it returns a value of "false".

The Persistent Storage Manager (PSM) enables objects to manage their persistent state. The PSM is associated with the default object manager and is accessed through the runtime interface, which is accessible to all objects 13 in the system 11. The set of calls associated with the PSM interface allows an object 13 to obtain objects of type "pointer to file" (as defined in the POSIX standard) from the object identity of the object. The object 13 can then read or write its persistent state using the referenced file in any way it likes.

It is noted that an object 13 managed by the default object manager 25 is not required to use the PSM to store its persistent state. However, an object that chooses not to utilize the PSM will be required to do all manipulations of the persistent state of the object 13 without the aid of the default object manager 25.

The interface to the PSM consists of the following calls. These calls are not directed to an object 13, but are local calls that are implemented in the system runtime, which is accessible to all objects 13 and which runs in the same process space 39 as the calling object 13. These functions are best thought of as a library which supplies the glue that holds an object 13 and that object's object manager 25 together.

```
FILE*
    psm_create(
        objref_t        location,
        tid_t           trans_id,
        objref_t        *obj_created,
        objref_t        group_with,
        classid_t       obj_class_id,
        acl_t           init_acl,
        mode_t          cr_mode,
        status_t        *status
    );
```

The function psm_create creates a file in the same location as the object referred to by the parameter "location". The object identity of the object created is returned in the parameter obj_created. In the preferred embodiment, the object identity encodes an indication of the computer 37 on which the object was created. A pointer to the file created as part of the operation is returned as the return value of the function. The object and the file returned both have the initial access control list (ACL) supplied in init_acl, and the file will be created in the mode indicated by cr_mode. The object will be registered with the object manager as being of the type indicated by obj_class_id.

It is important to realize that psm_create does not create an object, but merely provides persistent storage, an initial object reference, and registers the existence of the object with an object manager. Full object creation may require other activities, such as the initialization of the object's state. This is taken care of by the code which actually creates the object. The psm_create call will be made by that code to inform the system of the existence of the new object.

```
FILE*
    psm_open(
        objref_t        object,
        tid_t           trans_id,
        mode_t          open_mode,
        status_t        *status
    );
```

The function psm_open returns a pointer to the file associated with the object identified by the object identity in the parameter "object", opened with the mode specified by the parameter open_mode. The file must have been created with a call to psm_create.

```
boolean
    psm_delete(
        objref_t        object,
        tid_t           trans_id,
        status_t        *status
    );
```

The function psm_delete will delete the file associated with the object identified by the object identity passed in the parameter object, and will also remove any reference to the object in the object manager. The function returns the value "true" if the delete succeeded, otherwise it returns a value of "false".

```
objref_t
    psm_create_link(
        objref_t        to_object,
        tid_t           in_trans,
        oid_t           class_id,
        acl_t           init_acl,
        status_t        *status
    );
```

The function psm_create_link creates an object that is permanently associated with the object referred to by the parameter to_object. The object created will have the class specified in class_id. If specified, the object will have an access control list of init_acl; otherwise the object will have the ACL (access control list) of the object referred to by to_object. The newly created object will be associated with the persistent store of to_object, doing a subsequent psm_open on the object reference returned by this call will return the same value as doing a psm_open on to_object. The function will also register the object created as being in the same process group as to_object.

```
acl_t
    psm_get_acl(
        objref_t        for_object,
        status_t        *status
    );
```

The function psm_get_acl_id returns the access control list for the object identified by the parameter for_object.

```
boolean
    psm_set_acl(
        objref_t         for_object,
        acl_t            new_acl,
        status_t         *status
);
```

The function psm_set_acl_id sets the ACL for the object identified by the parameter for_object to new_acl. The functions returns "true" if successful, and "false" otherwise.

```
boolean
    psm_change_identity(
        objref_t         object,
        tid_t            trans_id,
        objref_t         new_id,
        status_t         *status
);
```

The function psm_change_oid will change the object identity of the object identified by the parameter object to that of the new object identity passed in the parameter new_id. This call is used only when the object formerly referred to by new_id, if any, has been or is about to be deleted. The function returns a value of true is successful; otherwise it returns a value of false.

```
boolean
    psm_inq_colocation(
        objref_t         object,
        status_t         *status
);
```

The function psm_ing_colocation is used to determine if the object identified by the parameter object is located in the same persistent store as the object making the call. The function returns true if the objects are colocated and false otherwise.

```
char*
    psm_get_path(
        objref_t         object,
        status_t         *status
);
```

The function psm_get_path returns an implementation dependent null-terminated string which corresponds to the pathname, if any, of the file containing the persistent state in the local file system of the object referred to by the parameter object. The string is not interpreted by the management apparatus; the programmer is responsible for understanding the string in the context of the local system and determining what operations are supported on such strings in that local system. If the local system does not support the concept of file pathnames psm_get_path returns NULL with an error status code.

Activation of Objects

In most systems, objects (or programs) must be explicitly invoked before use. In the object oriented distributed computing system 11 of the present invention, objects 13 get activated as needed, without requiring an explicit operation to activate them. Mere use of an object 13 through a request will cause an object to be activated, if it is not already in its active state.

As used herein, an object that is able to respond to requests is defined as "active". In order for an object 13 to be able to respond to requests, the code for the object's class must be loaded into a process 39, the supported request interfaces must be associated with their implementations in code, and the persistent data of the object 13 must be loaded up. These last two steps are done by a "class initialization" routine and an "object restore" routine, respectively. Loading of class code must be handled in a machine-dependent way. Once these steps are complete, the object 13 is ready and able to respond to any of the requests it supports.

The entities involved in object activation in the preferred embodiment are: a program referred to as "Genobj" 55, the default object manager 25, an entity referred to as a class expert 57, and the runtime library 27. Genobj 55 (FIG. 3b) is a process whose function is to prepare objects 13 to receive requests. An object that is so prepared is considered to be in its active state. Genobj 55 prepares an object 13 by (i) loading the code of the object's class into the address space of Genobj 55 (if necessary), (ii) invoking the "class initialization" function for the object's class, and (iii) invoking the "object restore" function with the objects persistent data. Other programs having a function similar to that of Genobj are suitable.

In this context, the default object manager 25 manages a set of objects and a set of processes. The default object manager's 25 objects are more or less permanent but the processes are initiated and terminated as needed. The default object manager knows the class of each of its objects and the location of each object's persistent data. The default object manager 25 also knows whether or not a given object 13 (or group of related objects) is currently associated with one of the processes managed by the default object manager 25. The default object manager 25 considers an object or object group that is associated with a process to be able to receive messages and hence to be "active". The default object manager 25 in the course of "activating" an object 13 will initiate a process 39 that is appropriate to the object's class. If a class does not specify a program 39 to initiate, the default object manager 25 initiates Genobj 55.

The class expert 57 (FIG. 3b) is an entity that manages information about an object class (or set of classes). The information includes the operation interfaces that the class supports and the names of certain initialization functions for the class. The class expert 57 also maintains information concerning the implementation (in code) of the object class.

The runtime library 27 is described previously. Briefly, the runtime library 27 is resident in every object 13 and hence every process 39. The runtime library 27 that is resident with Genobj 55 additionally interacts with Genobj 55 to coordinate activation and deactivation of objects 13.

As used in the following discussion a "user" is a human using the object oriented distributed computing system 11 of the present invention. A "client" is a program or object that makes a request (or method call) on another object in the system 11. The "client" may also be the entity that the user interacts with, typically through a keyboard and/or mouse. The attempted use of an object 13 by a client causes the object 13 to be activated, if the object is not already in its active state. Further, the terms "function", "routine", "handler" and "procedure" are used interchangeably in this discussion.

For purposes of illustration and not limitation, suppose a user M wants to know the phone number of another user J. The user M simply asks through her computer application for "phone information" on user J. Typically this involves user M typing user J's name into a menu selection or a form displayed by the computer application. As illustrated in FIG. 2, the computer application then performs the request-side version of the "get phone_info" request which is exported by the phone information ("pi") object 13*a* resident somewhere in the system 11. The request-side version of the request interacts with the runtime library 27 residing in the requesting process 39*a*. The runtime library 27 first contacts the location services 21 to find the location of the pi object's 13*a* object manager 25. The runtime library 27 then sends the actual "get phone_info" operation request to the manager of object managers (MOM) 29*a* that manages the object's object manager 25.

The runtime library 27 at the MOM 29*a* (manager of object managers) receives the packet containing the request sent by user M's computer application 39*a*. The runtime library 27 asks the manager of object managers 29*a* if it knows where the packet should be directed. More specifically, the runtime library 27 passes down the object identity and the interface identifier found in the packet under respective parameters and expects to receive back an "end point" (i.e., local socket address) to which the packet can be forwarded.

In response the manager of object managers 29*a* asks each of its object managers 23 if the object manager manages the requested object (i.e., the object specified by the object identity passed down by the runtime library 27). The default object manager 25 checks its internal tables 51 (FIG. 3*a*) to see if it manages the object 13*a*. If so the default object manager 25 maintains the identifier of the group of objects to which the specified object 13*a* belongs. (Object groups containing only one object are allowed.) The default object manager 25 then looks up state of the group of objects. A group maybe in any of the following three states:

"active"—the group is already associated with a process 39. At least one endpoint for the process is available for use and forwarding packets.

"pending"—a process 39 has been initiated for the group but the process has not yet registered its endpoints with the default object manager 25.

"inactive"—there is no process 39 associated with the group.

If the group is "active", the default object manager 25 returns the endpoints of the process 39 associated with the group. If the group is "pending", the default object manager 25 returns no endpoints since it does not have them yet, but returns an indication that it manages the specified object. If the group is "inactive", the default object manager 25 acquires a process 39 for the group.

In the preferred embodiment the default object manager 25 accomplishes process acquisition for a group as follows and illustrated in FIG. 3*a*. First, the default object manager 25*a* checks a pool 47 of "available" processes 39*c*, 39*d*. An available process is one which has registered one or more endpoints with the default object manager 25 but which is not yet associated with any object group. The default object manager 25 checks each process 39 in the pool 47 to find one that is compatible with the class of the specified object. Some processes (e.g., instances of Genobj) are compatible with many classes but others may be restricted to servicing only objects of a particular class. If default object manager 25 finds a compatible process 39*c* in pool 47, it marks the group as "active" in the default object manager's internal tables 51. The default object manager 25 also associates the endpoints of the found process 39*c* and process's operating system identifier with the group. The default manager 25 next returns the newly associated endpoints to the manager of object managers 29*a* and removes the process 39*c* from the available process pool 47.

If the default object manager 25 cannot find a compatible process in the pool 47 of available processes, the default object manager 25 initiates a compatible process 39*f*. To do this, the default object manager 25 determines the path of a compatible process 39*f* by looking at information pertaining to the class of the object. As was mentioned, if a class does not specify a process, the default object manager 25 will initiate Genobj 55. After initiating the process 39*f*, the default object manager 25 marks in its internal tables 51 that the object's group is "pending activation". The default object manager 25 also puts an entry 39*f* into a pool 53 of "pending processes". The entry for the process 39*f* contains the operating system identifier of the process and the identity of the group for which the process 39*f* is intended.

When the process 39*f* registers its endpoints (via a register_endpoints request on the default manager 25), its entry will be removed from the pending process pool 53 and the group it is intended for is marked in the internal tables 51 by the default manager 25 as "active". The default object manager 25 also associates the group with the process's endpoints and process identifier in its internal tables 51. It is noted that when a process that is initiated without a group association registers its endpoints, it gets moved from the pending process pool 53 to the available process pool 47.

In the case of Genobj 55 being initiated by the default object manager 25, Genobj performs the following as illustrated in FIG. 3*b*. Soon after being initiated by the default object manager 25, Genobj 55 asks the runtime library 27 for endpoints. Upon acquiring the endpoints, Genobj 55 performs the "register_endpoints" request on the default object manager 25. The parameters to the request include the operating system process identifier of this instance of Genobj 55 and the endpoints acquired from the runtime library 27.

In addition to registering endpoints with the default object manager 25, Genobj 55 performs a registration (of a different sort) with the runtime library 27. Genobj 55 registers an "unknown-object" function 61 (a function invoked when the runtime 27 receives a request it does not know how to handle). After performing both registrations, Genobj 55 turns control over to the runtime library 27 which can now start receiving requests (forwarded by the default object manager 25 or possibly sent directly by requesters). When the runtime library 27 receives a request it doesn't know how to handle, the runtime library 27 invokes the unknown-object function 61.

Genobj's unknown-object function (or handler) 61 interacts with the default object manager 25 through the get_obj_info() request to determine the class of the object and the location of the object's persistent data. Using the class identifier just acquired the function 61 locates and contacts the expert 57 for the class. From the class expert 57 the function finds out the names of the class initialization function and the object restore function through the get_class_info() request as shown in FIG. 3*b*. The unknown-object function 61 also possibly gets information it needs to load the class's implementation into the function's address space. After loading the class's implementation, the unknown-object function 61 invokes the class initialization function. The primary purpose of the class initialization function is to register the class's operation interfaces and deactivation handler with the runtime library 27. The unknown-object function 61 then invokes the class's object restore function which includes passing in the location of the object's persistent data. After the restore routine completes, the unknown-object function 61 registers the object and class with the runtime library 27. Finally the unknown-object function 61 returns control to the runtime 27.

The runtime library now has enough information (received from the request registrations and the object/class registration) to properly process the request (packet). And the object, having been restored, is now ready to receive the request specified by the packet. The runtime library 27 simply calls the stub which the object registered for the request, passing down the data found in the request packet. The stub unmarshalls the data and invokes the appropriate method of the object.

When the next request for the object 13 arrives in a packet, the runtime library 27 will be able to invoke the stub directly without recourse to the unknown-object function 61 since the object is at that time "known".

The advantage of the foregoing procedure is that it is transparent to the user and to client programs. The client that invoked the request on the object, has no awareness of whether or not the object 13 is active prior to issuance of the request. To that end, all objects appear to be available or active for processing requests even though they are not currently associated with a process. Thus, the present invention provides computer means for implementing operations and data of a target object (and moreover for receiving and servicing requests) for a target object independent of association of the target object with a process at the time the request was issued.

Deactivation of Objects

The class initialization routine of the object's class is responsible for registering a deactivation handler with the runtime. In the preferred embodiment, object managers 23 provide deactivation of processes in automatic response to the system 11 needing resources. When Genobj 55 receives a process termination request from the default object manager 25, it will ask the runtime library 27 to invoke the deactivation handlers for each registered object 13. The termination request from the default object manager 25 has a "priority" parameter that indicates how important it is to terminate the process 39. There are at least three priority values the parameter can take, ranging from "Please terminate if you aren't busy" to "Terminate or be killed ungracefully." Genobj 55 passes along the priority parameter to the runtime routine "deactivate_objects" which calls the deactivation handlers. Before invoking the deactivation handlers, the deactivate_objects routine compares the value of the priority parameter to the "unwillingness to terminate" values that are registered by each object 13. If the priority level is greater than each "unwillingness" level, the deactivation handlers are invoked. If not, the "deactivate_objects" routine returns to Genobj 55, passing along the current maximum unwillingness level, and Genobj 55, in turn, passes this value back to the default object manager 25.

An object 13 is able to change its "unwillingness" level whenever appropriate. For example, an object 13 that has not received any method requests for some time may tell the runtime library 27 that its unwillingness level is low. If this object 13 were to then receive method requests, it might then tell the runtime library 27 that its unwillingness level was high. The runtime library 27 keeps track of the current unwillingness level of each object 13.

Objects Activating Other Objects in its Object Group

The restore routine of an object may decide (based on its persistent data) that it needs to have other objects in its object group active in Genobj. The restore routine can cause another object to be activated by calling Genobj's unknown-object function (handler) 61, passing in the object identity of the desired object 13. The restore routine may do this for as many objects as it needs. The unknown-object handler 61 checks to see that the desired object is not already active. If the object isn't active, the handler 61 behaves almost the same way as it behaves when called by the runtime library 27 described above. The differences relate to issues of concurrency control rather than to any differences in end effect. Note that calls to the unknown-object handler 61 may be recursive. For example, the handler may be called by the runtime library 27 on a particular object "A" whose restore routine calls the handler on object "B". The restore routine for "B" may, in turn, call the handler on object "C" and so forth. Eventually, all the needed objects 13 will have their classes initialized and their states restored, and control will ultimately return to the runtime library 27.

Control of Class Loading and Initialization

Any number of objects in an object group may be of the same class. When each object 13 gets activated in Genobj 55, Genobj checks to see whether it has already "loaded" and initialized the class of the object. If so, Genobj 55 refrains from re-loading and reinitializing the class. Genobj 55 does, however, invoke the restore function whether or not the class has been previously loaded. This is done because the restore function serves to restore the state of the object 13 rather than class (and this needs to be done for each object).

Equivalents

While the invention has been particularly shown and described with reference to a preferred embodiment thereof, it will be understood by those skilled in the art that various changes in form and details may be made therein without departing from the spirit and scope of the invention as defined by the appended claims.

We claim:

1. An object oriented distributed computing system supporting a plurality of object models, each object model being defined by the way the persistent state of the model's objects is managed and the way operations on the model's objects are mapped into code to perform the operations, said mapping into code being the execution model of the model's objects, comprising:

a first computer, a second computer, a manager of object managers located on the first computer, a manager of object managers located on the second computer, a plurality of object managers located on the first computer, each based on a different object model, at least one object manager located on the second computer, based on an object model, objects of one object model, including a persistent state and an execution model, communicating operation requests to objects of a different object model by making calls in the system, each request including (i) an object identifier indicating a target object and (ii) an indication of an operation desired to be performed by the target object, each object manager supporting operation and existence of objects associated with that object manager according to the object model of that object manager, and each manager of object managers communicating with respective associated object managers in a manner free of preprogrammed code in the operation call, of the respective object models of the object managers to locate objects to which operation requests are to be communicated, such that a request by a first object managed by a first object manager on the first computer to perform an operation on a second object managed by a second object manager on the same computer is communicated from the first object to the manager of object managers on the first computer and then to the second object manager, the manager of object managers on the first computer being responsive to the first object and (i) based On the second objects identifier but independent of the second object type and independent of object model of the second object manager, determines whether the second object is managed by the second object manager and (ii) communicates the request to the second object manager, the second object manager, in accordance with its object model, obtains the persistent state and execution model of the second object and therefrom activates the second object and delivers the request to the second object, and a request by the first object managed by the first object manager on the first computer to perform an operation on a third object managed by a third object manager on the second computer is communicated from the first object to the manager of object managers on the second computer and then to the third object manager, the manager of object managers on the second computer being responsive to the first object and (i) based on the third objects identifier but independent of the third object type and independent of object model of the third object manager, determines whether the third object is managed by the third object manager and (ii) communicates the request to the third object manager, the third object manager, in accordance with its object model, obtains the persistent state and execution model of the third object and therefrom activates the third object and delivers the request to the third object.

2. The object oriented distributed computing system of claim 1 in which each manager of object managers uses a common interface to communicate with each of the object managers located on the same computer.

* * * * *

UNITED STATES PATENT AND TRADEMARK OFFICE
CERTIFICATE OF CORRECTION

PATENT NO.   : 5,475,817
DATED        : December 12, 1995
INVENTOR(S)  : James H. Waldo et al.

It is certified that error appears in the above-identified patent and that said Letters Patent is hereby corrected as shown below:

Column 6,
Line 43, delete "on" and insert therefor -- On--

Column 19,
Line 5, after "based" delete "On" and insert therefor -- on --

Signed and Sealed this

Twenty-first Day of June, 2005

JON W. DUDAS
*Director of the United States Patent and Trademark Office*